UNITED STATES PATENT OFFICE.

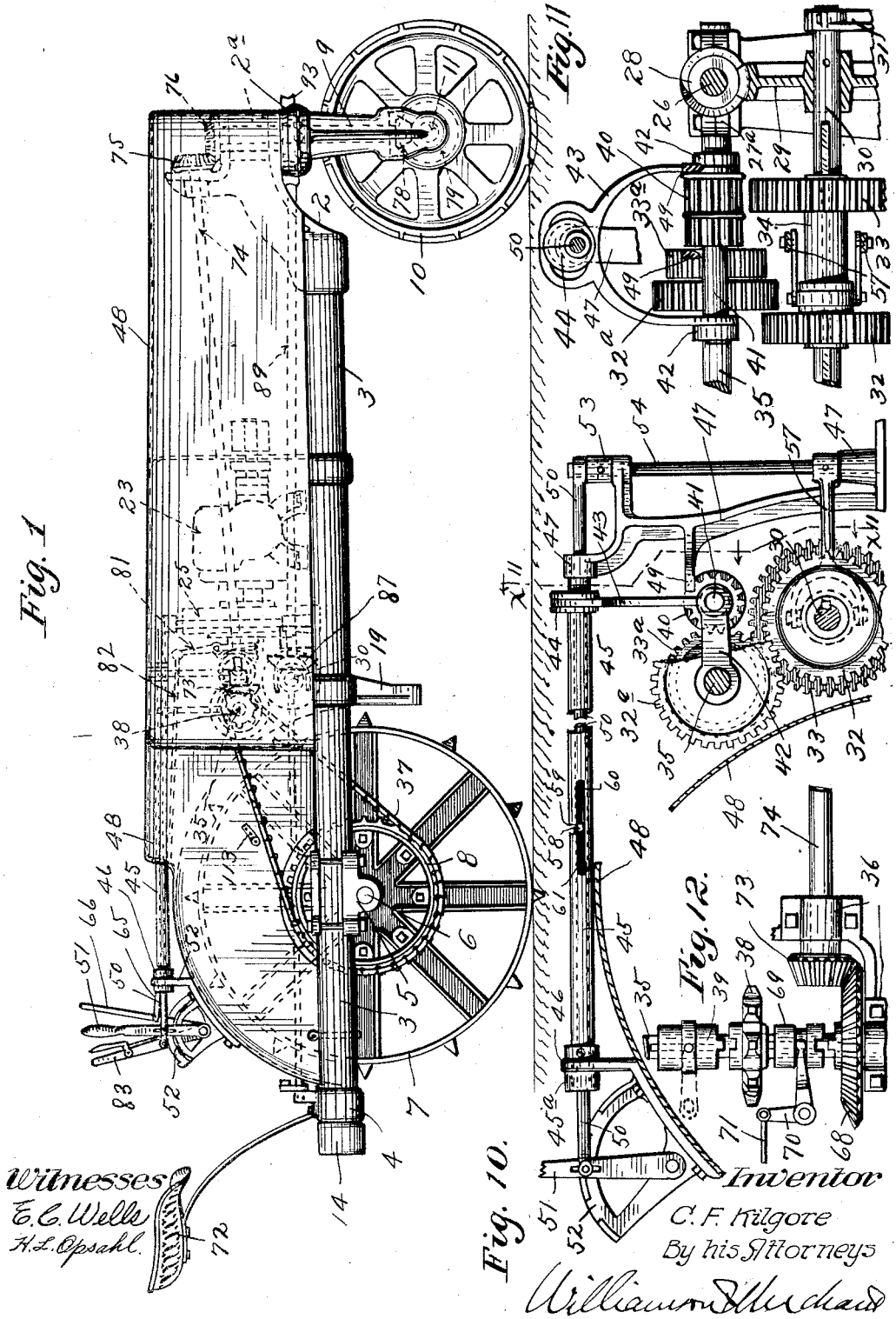

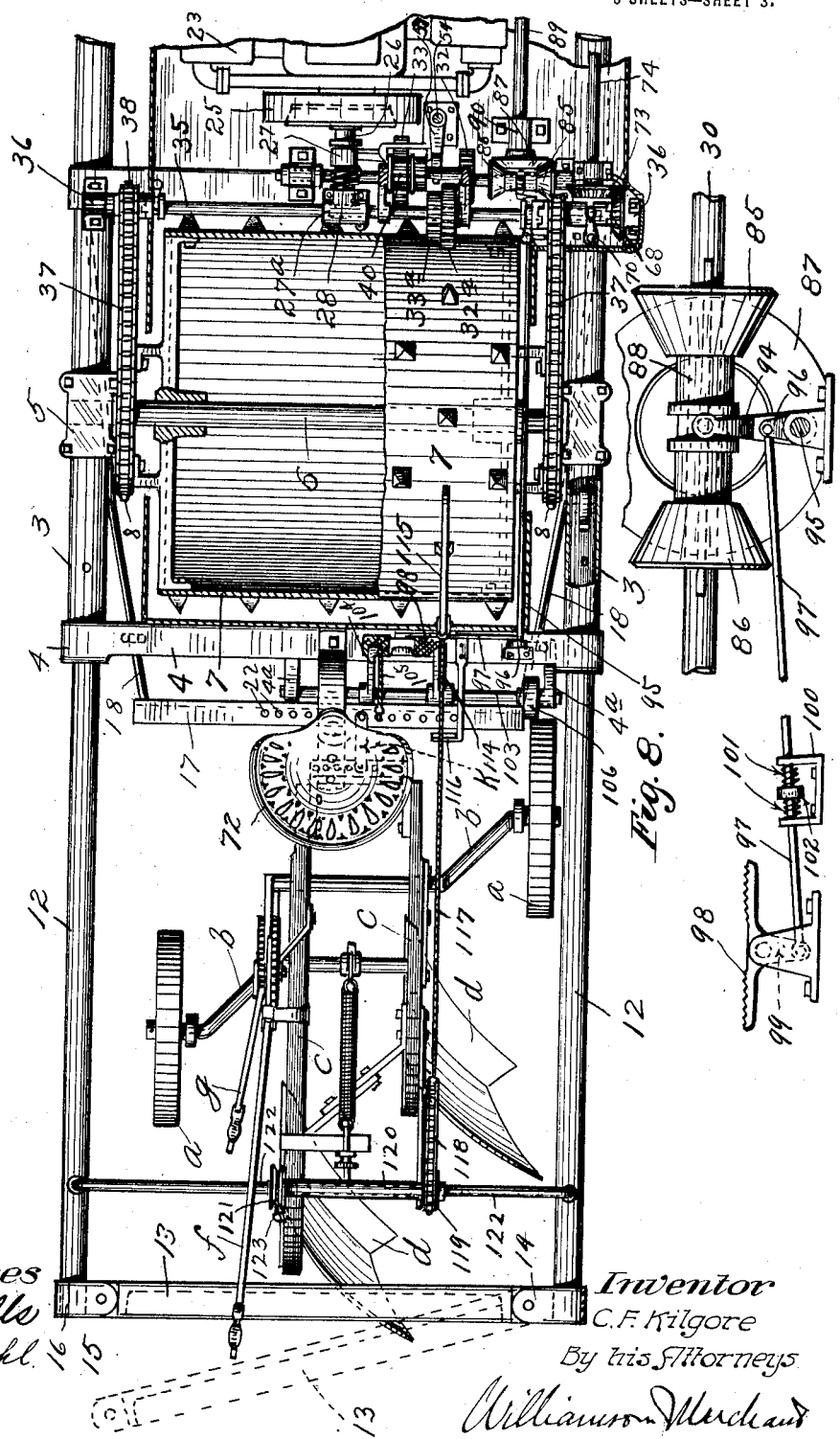

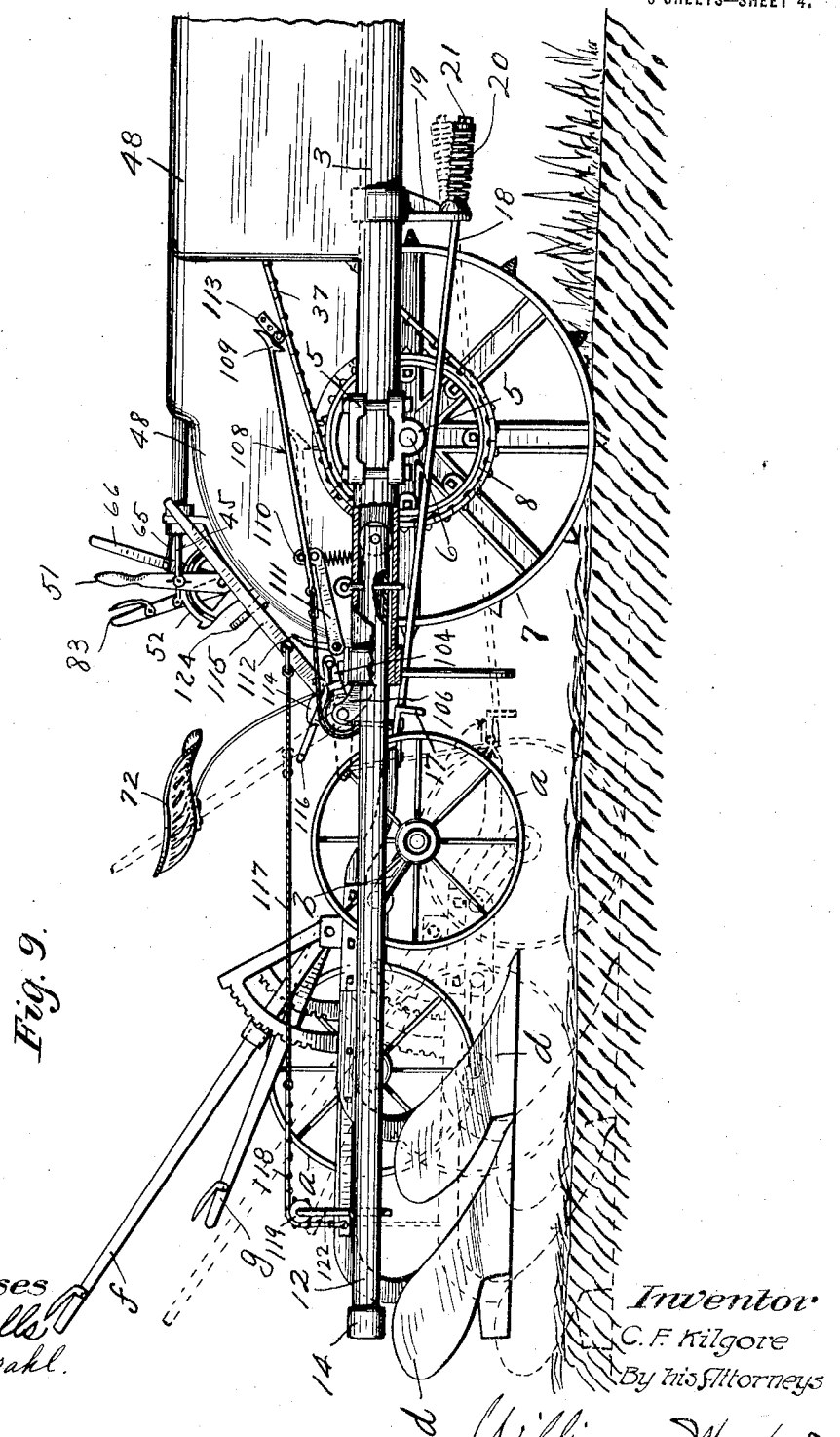

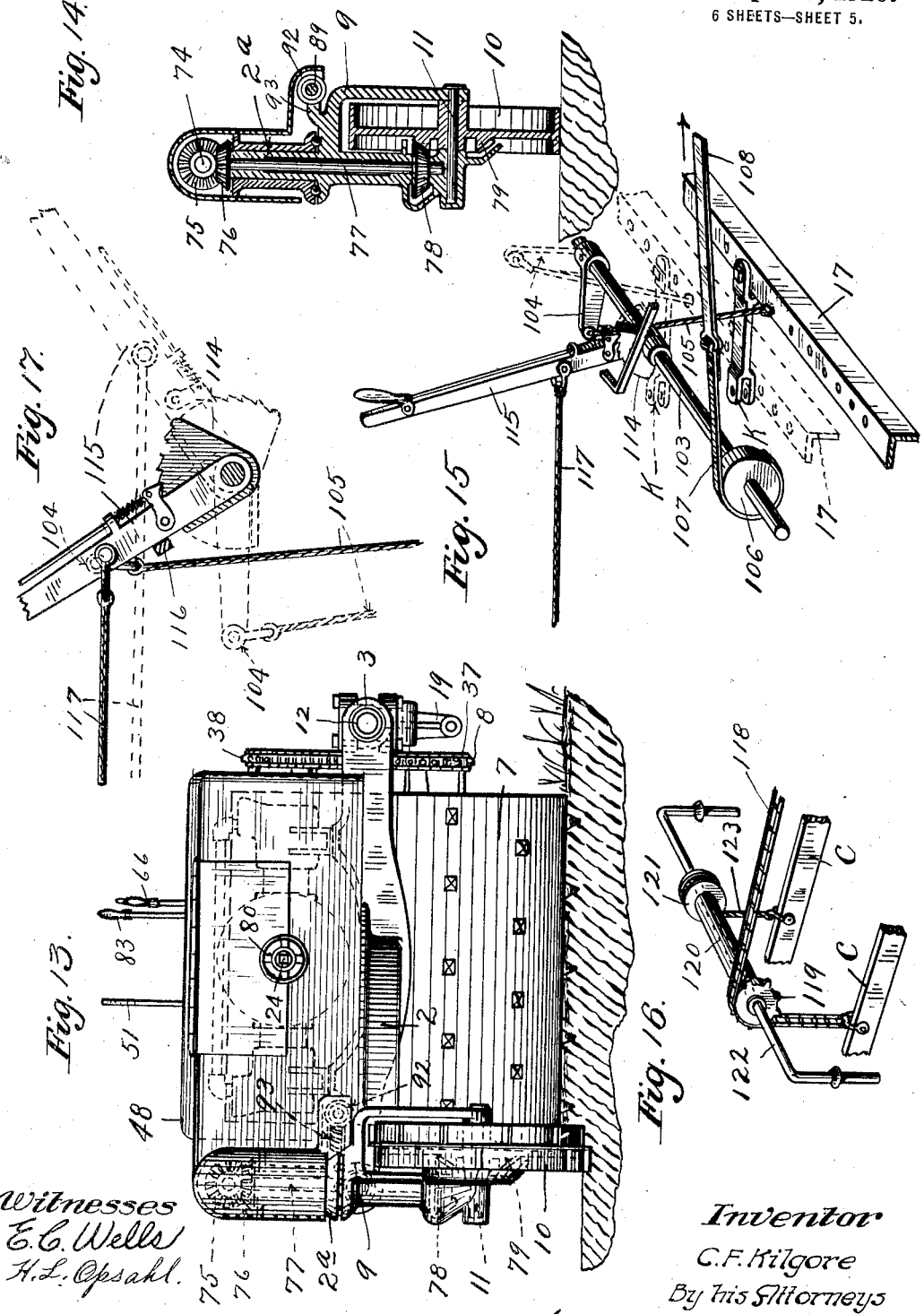

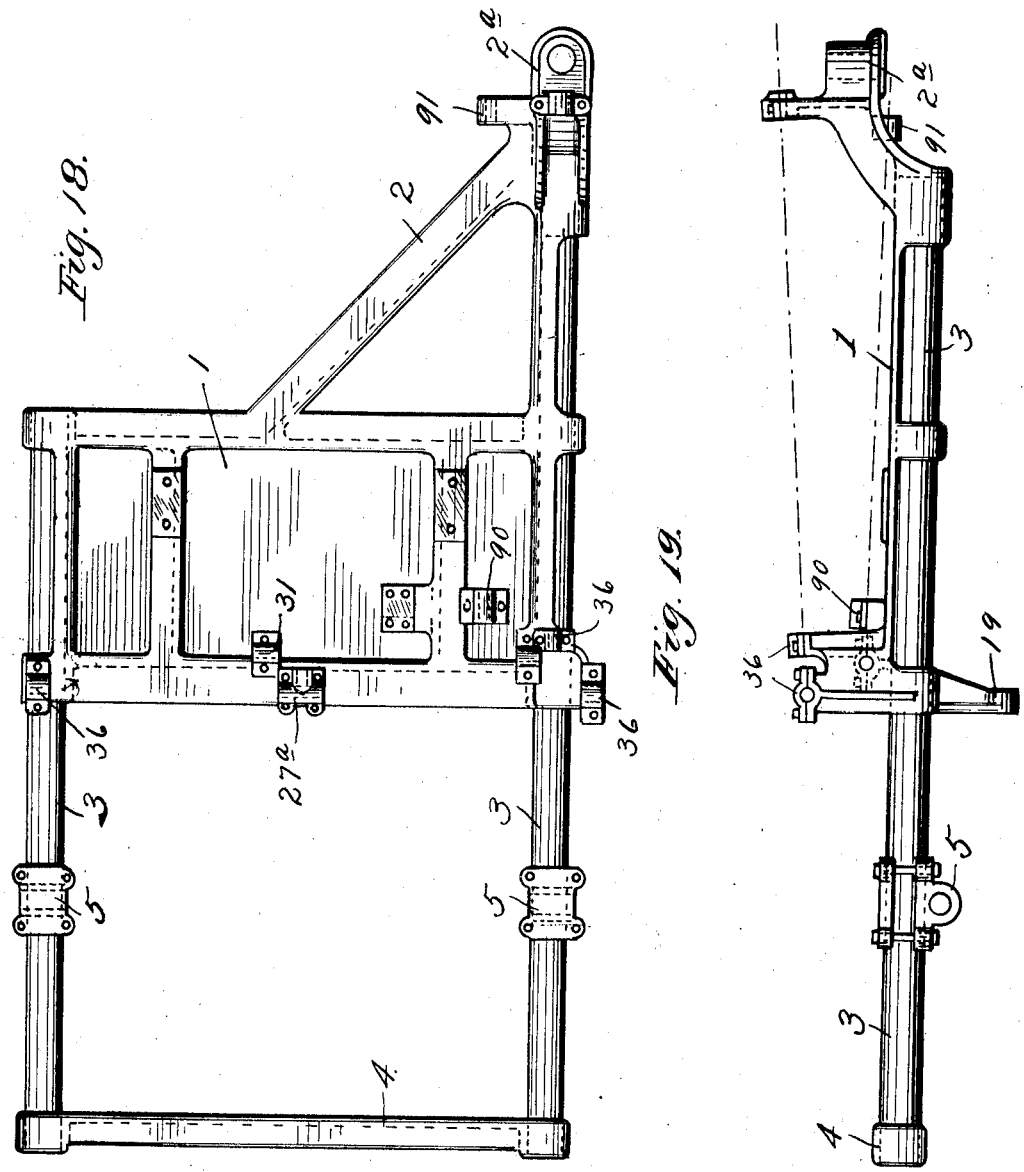

CHARLES F. KILGORE, OF MINNEAPOLIS, MINNESOTA.

TRACTOR.

1,338,510.

Specification of Letters Patent.

Patented Apr. 27, 1920.

Application filed April 29, 1916, Serial No. 94,324. Renewed August 23, 1919. Serial No. 319,431.

*To all whom it may concern:*

Be it known that I, CHARLES F. KILGORE, a citizen of the United States, residing at Minneapolis, in the county of Hennepin and State of Minnesota, have invented certain new and useful Improvements in Tractors; and I do hereby declare the following to be a full, clear, and exact description of the invention, such as will enable others skilled in the art to which it appertains to make and use the same.

My invention has for its object to provide an improved tractor, and to such ends, generally stated, the invention consists of the novel devices and combinations of devices hereinafter described and defined in the claims.

This improved tractor has two wheels, to-wit, a large wide-faced drum-like rear traction wheel and a front steering, or guide wheel. These two wheels carry the entire load of the tractor, and provision is made whereby either of the said two wheels may be driven along, at will, or both may be simultaneously driven, so that the entire weight of the tractor is rendered effective in traction.

When the tractor is used for plowing, a large drum-like rear traction wheel cannot, of course, run in a previously formed furrow, but must run upon the unplowed ground, and, in fact, such is a much desired arrangement, because the said drum-like wheel will press down the stubble, weeds and the like, so that plows, working at the rear thereof, will turn them under. Also, in order to adapt the tractor for plowing and the front guide wheel to run in the last previously formed furrow, to automatically guide the tractor, the said front steering wheel is laterally offset, so that it runs on a line just outward of one side of the main traction wheel or drum.

The main tractor frame has a rear extension, and, as an important feature of this invention, I employ a gang plow which has its own supporting wheels, and this plow I arrange to work immediately at the rear of the drum-like traction wheel and provide means whereby it may be picked up, wheels, plows and all, lifted above the ground and supported from the said rear extension of the main frame.

The invention involves the above noted and various other highly important novel features which will now be described, in connection with the drawings which illustrate the machine in what I, at present, believe to be its preferred form.

In the accompanying drawings which illustrate the invention, like characters indicate like parts throughout the several views.

Referring to the drawings:

Figure 1 is a right side elevation of the improved tractor;

Fig. 2 is a plan view of the tractor;

Fig. 3 is a plan view with some parts broken away, showing the controller for the reversible variable speed transmission mechanism;

Fig. 4 is a detail in side elevation of the parts found in the vicinity of the line marked $x^4$ $x^4$ of Fig. 3;

Fig. 5 is a view corresponding to Fig. 4, but illustrating a different adjustment of the parts;

Fig. 6 is a diagrammatic view showing the form of a controller guiding slot formed in the sleeve of the controller;

Fig. 7 is a plan view with some parts broken away and some parts sectioned, showing a gang plow attached to the rear of the tractor frame;

Fig. 8 is a detail in side elevation with some parts broken away, showing the reversible friction gear of the steering mechanism and its actuating devices;

Fig. 9 is a side elevation of the parts shown in Fig. 7, some parts being broken away and some parts being sectioned;

Fig. 10 is a section taken approximately on the line $x^{10}$ $x^{10}$ of Fig. 2, but with some parts broken away, showing the shift gears of the reversible variable speed transmission mechanism and also the controlling mechanism therefor;

Fig. 11 is a section taken on the line $x^{11}$ $x^{11}$ of Fig. 10;

Fig. 12 is a plan view showing in detail the clutch and driving mechanism for the front steering wheel;

Fig. 13 is a front view of the tractor;

Fig. 14 is a vertical section taken on the line $x^{14}$ $x^{14}$ of Fig. 2;

Fig. 15 is a perspective view showing forward portions of the plow lift mechanism;

Fig. 16 is a perspective view showing rear portions of the plow lifting mechanism;

Fig. 17 is a fragmentary view partly in side elevation and partly in vertical section showing the plow lifting lever best illustrated in Fig. 15;

Fig. 18 is a plan view of the main frame of the tractor, with all parts removed therefrom; and Fig. 19 is a side elevation of said frame.

*Tractor truck.*

The main frame of the machine, in itself, is of novel construction, and, as preferably designed, is made up of a large rectangular body-like casting 1 having at one side, a forwardly projected integral arm 2 and provided with rigidly secured laterally spaced rearwardly extended bars 3. These bars 3 are preferably made tubular of heavy wrought or steel pipe, and, at their rear ends, are tied together by a heavy cast cross bar 4. The said frame members just described, are all rigidly united, and to the intermediate rear portions of the bars 3 are rigidly secured axle bearings 5 in which the axle 6 of the rear traction wheel or drum 7 is journaled.

One of the side bars 3, to-wit, as shown, the right hand bar, is forwardly extended and secured to the head of the arm 2 of the main frame casting, so that it reinforces the said arm. At its extreme front end, the said arm 2 is formed with a vertical bearing sleeve 2ª (see Figs. 1 to 14), in which is swiveled the vertical shank of a bifurcated wheel bracket 9. The front steering wheel 10 works between the prongs of the wheel bracket 9 and is journaled thereto by means of a horizontal axle 11.

The rearwardly extensible supplemental frame, as best shown in Figs. 2, 7 and 9, comprises laterally spaced extension bars 12, preferably made of wrought or steel pipe, and arranged to telescopically slide within the tubular main side bars 3. At their rear ends, the extension bars 12 are tied together by a cross bar 13 pivoted at one end to a head 14 on the rear end of one of the bars 12 and detachably connected, at its other end, by a cam 15 to a similar head 16 rigid on the rear end of the other extension bar 12, to reduce the frictional engagement.

For drawing plows or other implements or vehicles, the tractor truck is provided with a draft connection, preferably in the form of a yoke-like draw bar made up of a floating cross bar 17 having laterally spaced draw rods 18 extended forward on the opposite sides of the rear traction wheel 7, and passed loosely through heavy draft lugs 19 secured to and depending from the main frame bars 3. As shown, cushioning springs 20 are placed on the front ends of the draft rods 18 and compressed between the lugs 19 and nuts or heads 21 on the extreme front ends of the said rods. The bar 17, as shown, is provided with a series of perforations 22, any of which the plow, or other device to be drawn, may be attached at any proper position transversely of the tractor.

*Power and transmission mechanism.*

As a motor, a horizontally opposed two-cylinder explosive engine is preferably employed.

This engine, which is indicated, as an entirety, by the numeral 23, has its base rigidly secured on the main frame casting 1 with its crank shaft 24 extended longitudinally of the tractor. At its rear end, the engine crank shaft is arranged to be connected, at will, by means of a suitable friction clutch 25, to the front end of a short shaft 26 (see particularly Figs. 7 and 11), that is mounted in suitable bearings 27 and 27ª on said casting, and is provided with a worm 28.

This worm 28 engages a worm wheel 29 on a transverse counter shaft 30 journaled in the bearings 31 on the main frame. Mounted to rotate with the shaft 30, but keyed to slide thereon, are spur gears 32 and 33 connected by a common hub 34. The gear 33 is larger than the gear 34 and the said two gears, at will, are adapted to be slid into engagement, respectively, with spur gears 32ª and 33ª secured to an overlying transverse counter shaft 35 journaled in the bearings 27ª and in outside bearings 36 on the main frame casting 1.

Heavy sprocket chains 37 run over the larger sprockets 8 of the rear traction wheel 7 and over small sprockets 38 that are normally loose on the counter shaft 35 but are adapted to be journaled thereto, at will, by sliding half clutches 39 that are engageable with coöperating half clutches on the sprocket 38 (see Figs. 7 and 12). The mechanism just described will drive the rear traction wheel in a forward direction at two speeds, relatively slow speed being produced by engagement of the gear 32 with the gear 32ª (see Fig. 11) and relatively high speed being produced by engagement of the gear 33 with the gear 33ª.

For reverse, I provide a duplex double-flanged spur pinion 40 (see Figs. 10 and 11), that are mounted to freely slide and freely rotate on a spindle 41 rigidly secured to the front ends of parallel arms 42 shown as pivoted on the shaft 35. The spindle 41 is also hung in the depending arms of a lifting yoke 43, the upper portion of which is hung on an eccentric 44. This eccentric 44 is secured on the front end of a controller sleeve 45 that is held against endwise movements but mounted for rotary movements in a rear bearing bracket 46 and a front bearing bracket 47. At its rear end, the controller sleeve 45 is provided with an operating lever 45ª. The rear bearing bracket 46 is mounted on a hood 48, to be hereinafter more fully described, and the front bearing bracket 47 is rigidly secured on the main casting 1. Here it should be noted that said bracket 47 is provided with laterally spaced arms 49 that embrace the upper portions of the duplex pinion 40 and hold the same against axial movements when raised but not when lowered. Thus, normally, the right hand portion of said pinion 40, as shown in Fig. 11, is normally held in alinement with the gear 33, when the latter is in neutral position, as shown in said Fig. 11.

A controller rod 50 (see particularly Figs. 1, 4, 5, 6 and 10), is mounted to slide in the controller sleeve 45. At its rear end, the said rod 50 is connected to an operating lever 51 adapted to be set in three different positions on a latch arch 52, shown as formed integral with the bearing 46. At its front end, said rod 50 is connected to an arm 53 secured to the upper end of an upright rock shaft 54 journaled in the bracket 47 and provided near its lower end with a shipper fork 57 in which the gear connecting sleeve 34 is loosely journaled.

The intermediate portion of the controller rod 50 is provided with a laterally projecting pin or stud 58 that works in a complex slot 59, 60, 61 and 62, formed in the controller sleeve 45.

The operation of this gear shaft controller may be briefly described as follows:

In Figs. 1, 3, 10 and 11, the full lines show the parts in neutral position, that is, with the transmission gears thrown out of action. To move the gear 33 into mesh with 33ª for high speed forward, the controller sleeve 45 must be set as in the views above described, so that its pin 58 will be alined with the slots 60 and 61, and the controller rod must then be moved rearward so as to carry the said pin 58 into the slot 61. To move the gear 32 into mesh with the gear 32ª for slow speed forward, requires the same operation, except that the rod 50 is forced forward so as to carry its pin 58 into the slot 60. For reverse, the parts must be in neutral position, as above first described, so as to aline the pin 58 with the transverse slot 59, and then, by rotation of the controller sleeve 45, the slot 62 thereof, is alined with said pin and then the controller rod can be moved rearward into the slot 62, so as to thereby rotate the eccentric 44, and through the yoke 43, force the right hand portion of the duplex pinion 40, (directions being taken in respect to Fig. 11) into mesh with the gear 33. Then when this is done, the reversal of the drive is accomplished by moving the lever 51 and controller rod 50 rearward, thereby sliding the left hand portion of the said pinion 40 into mesh with the gear 33ª. This sliding movement of the pinion 40, while in mesh with the gear 33, is made positive by the flanges of the said pinion which embraces the teeth of the said gear 33. It has already been noted that sliding movements of the said gears 32 and 33 are produced by forward and rearward movements of the lever 51 and controller rod 50. It must be noted that it is impossible to throw the reverse gear into action at any time, except when the transmission gears 32 and 33 are in neutral or inoperative positions.

The above is a description of the operation of the transmission mechanism from the engine to the main or rear traction wheel.

For simultaneously throwing the two sliding half clutches 39 into or out of engagement with the half clutches on the sprockets 38, any suitable connections may be provided, and, in fact, it is not absolutely necessary that the double drive between the shaft 35 and the rear traction wheel be provided, but it is desirable, because it relieves the said shaft of considerable torque. As shown in Fig. 2, the connections for simultaneously moving the said half clutches comprises connecting rods 63, a three-armed bell crank lever 64, rod 65, lever 66 and latch arch 67, which latter is secured on the hood 48 (see also Figs. 1 and 9).

*Front wheel drive*

The drive or transmission to the front steering wheel is from the shaft 35, which shaft will be continuously driven from the engine at a relatively slow speed as long as the friction clutch 25 and either the variable speed or reverse gears are in action. The said connections, as shown, are as follows:

Referring particularly to Figs. 7, 12 and 14, the numeral 68 indicates a spur gear that is loosely journaled, as shown, on the right hand end of the shaft 35 and is provided with a half clutch that is adapted to be engaged, at will, by a half clutch 69 keyed to slide upon, but to rotate with said shaft 35. This half clutch 69 is adapted to be moved by a bell crank shipper lever 70, which, by a rod 71 is adapted to be connected to a suitable operating lever, not shown, but which, like the other controlling levers, would be within reach of the operator's seat 72, which is carried from the transverse rear bar 4 of the main frame. The gear 68 meshes with a beveled pinion 73 on the rear end of a longitudinal counter shaft 74 journaled in the bearing 36, at its rear end, and at its front end, journaled in a bearing lug on the head 2ª (see Fig. 1).

In its extreme front end, the shaft 74 is provided with a miter gear 75 that engages with a miter gear 76 on the upper end of a short vertical shaft 77 that is journaled in the shank or upright portion of the wheel bracket 9. At its lower end, the shaft 77 is provided with a beveled gear 78 that meshes with a beveled gear 79 carried by the front or steering wheel 10.

From the above, it is apparent that the front steering wheel is subject to the variable speed forward and to the reverse drive imparted to the shaft 35. It is also evident that, by manipulation of the clutches described, the rear traction wheel may be driven while the front wheel is idle, or that the front wheel may be driven while the rear wheel is idle, or that both of the said wheels may be simultaneously driven, by which latter driving action, all of the weight of the tractor is rendered effective in traction.

To adapt the tractor for use as a stationary power plant, the engine crank shaft 24, at its front end, is shown as provided with a driving pulley 80 (see Fig. 2). When the friction clutch 25 is opened or released, only the engine crank shaft and the pulley 80 will be driven. Here it may be noted that the movable member of the said clutch 25 is subject to a shipper lever 81, which, by a rod 82, is connected to a lever 83 that coöperates with a latch segment 84 on the hood 48 (see Figs. 1, 2 and 9).

*Power steering mechanism.*

Considerable power is required to impart the oscillatory steering movements to the front wheel 10, and hence, I provide a reversible engine driven steering connection for accomplishing this steering movement. Preferably, and as shown, I employ a reversible frictional beveled gear mechanism, best shown in Figs. 7 and 8, comprising reversely faced friction cones or pinions 85 and 86, and a coöperating frictional beveled wheel 87. The said cones 85 are connected to a common sleeve 88 to slide upon, but to rotate with the counter shaft 30, which counter shaft, like the counter shaft 35, is continuously driven from the engine, at a relatively slow speed, whenever the engine is operating and the friction clutch 25 is in action. The friction wheel 87 is carried by the rear end of a longitudinal shaft 89 journaled in suitable bearings 90 and 91, respectively, on the main casting 1 and on the front end of the arm 2. At its front end, the said shaft 89 is provided with a worm 92 that meshes with a worm gear or sector 93 rigidly secured to the wheel brackets 9.

By sliding movements of the sleeve 88, either of the cones 85 and 86, may be frictionally engaged with the friction wheel 87 at will, so that, as is evident, the power of the engine may be used to rotate the shaft 89 in either direction, at will, and through the worm 92 and gear 93 to impart the desired oscillatory steering movements to the front wheel 10. Such sliding movements may be imparted to the sleeve 88 and its cones by means of a shipper lever 94 (see Fig. 8), secured to the front end of a longitudinal rock shaft 95 mounted in suitable bearings on the main frame and provided at its rear end with a small arm 96, which, by a rod 97, is connected to the depending arms of the foot lever or treadle 98, which latter is pivoted to a suitable bearing 99 on the rear bar 4 of the main frame, and within reach of the foot of the operator from the seat 72. Normally, the cones 85 and 86 are held in neutral or inoperative positions, and this, as shown, is accomplished by a simple device shown in Fig. 8, consisting simply of a U-shaped bracket 100, and opposing coiled springs 101 that re-act against the prongs of said bracket and against a collar 102 fixed on the rod 97. The said bracket 100 is rigidly secured to the rear frame bar 4.

*The plow.*

The plow employed is preferably a sulky plow of commercial form, such as can be bought on the open market, and of the parts thereof, it is only desirable for the purposes of this case to briefly note the wheels *a*, the cranks axles *b*, the plow beams *c*, plows *d*, and the customary operating levers *f* and *g*. When the plow is to be connected to the tractor, the extension frame 12—13 is extended, as shown, in Fig. 7, and the plow is placed within the extension, as shown in said view. The purpose of making the rear bar 13 displaceable, is to make it an easy matter to get the plow inside and outside of the frame extension. The said plow can be coupled to the cross bar 17 of the draft yoke, by any suitable means, such, for example, as by means of a connecting link or clevis *k*.

It may now be noted that the hood 48, heretofore noted briefly, is arranged to cover the rear traction wheel, the engine, the main frame, driving mechanism and the forwardly extended arm of said main frame. Preferably, the said hood is made from quite thin sheet steel and may be provided with the necessary openings giving access to the parts requiring frequent attention.

*Plow lift.*

For lifting the sulky gang plow bodily from the rear extension of the tractor frame, I provide an engine-actuated plow lifting mechanism, which preferably, and as shown, involves the following mechanism or devices:

The numeral 103 indicates a transverse shaft (see particularly Figs. 7, 9, 15 and 17) journaled in suitable bearing brackets 4$^a$ rigidly but preferably detachably secured to the rear frame bar 4. An arm 104 carried by the shaft 103 is connected by a cable 105, to the intermediate portion of the transverse bar 17 of the draft yoke, to which bar it will be remembered the front ends of the plow beams are connected. The numeral 106 indicates a small drum also secured to the shaft 103. The numeral 107 indicates a metallic strap or other flexible connection, one end of which is wound upon and secured to the drum 106, and the other end of which is connected to the rear end of a pull bar 108 provided at its free front end with a hook 109. This bar 108 is mounted to slide between vertically spaced guide pinions 110 carried by the free end of an upwardly spring-pressed lever 111 that is pivoted to a suitable bearing on the rear frame bar 4 and is provided with a foot piece 112, which latter is shown only in Fig. 9. Normally, the upwardly spring-pressed arm 111 holds the hooked end 109 of the bar 108 just above, but out of engagement with the right hand sprocket chain 37, as indicated by dotted lines in Fig. 9. The numeral 113 indicates a stud or releasing projection secured on the adjacent side of the hood 48, and by which the hook 109 is positively forced out of engagement with said chain 37, as hereinafter described.

Rigidly secured to the shaft 103 (see Figs. 15 and 17), is a flaring pocket 114. The numeral 115 indicates a lifting lever, the lower end of which works within the pocket 114 and is loosely pivoted on the said shaft 103.

Extreme rearward movement of the lever 115 is limited by a stop 116 shown as rigidly secured to the rear frame bar 4. The upper end of the lever 115 is within reach from the seat 72. Its intermediate portion is connected to the front end of a cable 117, and the rear end of which, in the construction illustrated, is attached to the front end of a sprocket chain 118, the rear end of which is attached to the furrow side plow beam arm, as best shown in Figs. 9 and 16. The sprocket chain 18 runs over a sprocket 119 connected to one end of a sleeve 120, which sleeve, at its other end, is provided with a windlass drum 121. The sleeve 120 is journaled on a rod 122 which has down-turned ends detachably seated in perforations in the extension bars 12. The numeral 123 indicates a short cable, the lower end of which is attached to the left side plow beam c and the other end of which is attached to and wound upon the drum 121.

To raise the plow, as an entirety, the operator first steps on the foot piece 112 of the releasing lever 110, thereby depressing the hook end 109 of the bar 108, so that said hook will engage one of the forwardly moving upper links of the coöperating chain 37. By this engagement, the strap 107 pulls on the drum 106 and rotates the shaft 103. The first effect of this rotation of the shaft 103 is to lift the draft bar 17, and, consequently, the front ends of the plow beams, so that the plows will almost immediately run to the upper surface of the ground where they may be more easily lifted bodily. At about the time the front ends of the plows reach the surface of the ground, the lever pocket 114 should normally occupy the extreme dotted line position at the left in Fig. 17, will reach the full line, Fig. 17, and under continued rotation of the shaft 103, will, through the connections 118, 123 and coöperating devices, lift the rear ends of the plow beams and the plows bodily, and, while the plows are thus being lifted bodily at the rear, continued movement of the arms 104 completes the lifting of the front ends of the plow beams, and also the wheels of the gang plow clear above the ground, as indicated by full lines in Fig. 9. When the parts reach the position shown by full lines in Fig. 9, the lever 115 is automatically engaged with a spring latch hook 124 on the rear portion of the hood 48, and immediately after following this engagement, the hook 109 of the bar 108 is engaged with the trip stud 113, and thus automatically disengaged from the coöperating chain 37.

*Summary of operation.*

The manner in which the tractor may be driven at different speeds forward or reversely driven backward, has already been clearly stated. In turning a curve having a radius much greater than the distance between the front and rear wheels of a tractor, it is advisable to drive the wheels of the tractor from the engine. The pull produced by the front wheel, when thus driven, greatly assists in turning curves, and, in fact, greatly assists in driving the tractor even when going straight ahead, and especially, this is true when the ground is rough. However, for turning very short curves, it is advisable to throw the driving connections to the rear traction wheel out of action and to drive only the front wheel. When the said front wheel is set at a right angle to the axis of the rear wheel and is then driven when the rear wheel is idle, the tractor may be turned on the central portion of the rear wheel, thus turning the tractor on a curve having a radius greater than the distance between the two wheels. This is very important in plowing where it is desirable frequently, to make turns at, or approximately at a right angle. In turning abrupt corners with the tractor while the plow is attached thereto, the plow must first be lifted out of the ground and then when the tractor is abruptly turned, as above stated, the plows will be shifted from one line to a line at a right angle so that they will plow square corners. In plowing where the front wheel runs in the previously formed furrow and operating to automatically guide the tractor, it always finds a solid smooth surface at the bottom of the furrow upon which it runs, so that it will be very efficient in traction and will very greatly assist in driving the tractor when the plows are pulled through clay or heavy soil.

As the plows are supported by their own truck or wheel-equipped frame, the depth of the cut of the plows will be limited entirely by adjustment of the plow mechanism proper and the plows will neither be raised nor lowered by vertical movements of the extended rear portion of the tractor frame, due to irregularities in the ground being plowed. This is very important. It is, of course, understood that when the plows are in action, the connections between the plow and the extended portion of the truck frame will be slack, so that they do not in any way interfere with the relative vertical movements of the plow and truck frame. As the plow, as an entirety, is lifted from the ground, the turning of the plow is done while the plow is suspended, and hence, offers no resistance whatever, to the turning movement of the tractor.

What I claim is:

1. A tractor having a wide drum-like rear traction wheel carrying the weight of the rear portion of the tractor and giving lateral stability thereto, and a single front steering wheel carrying the weight of the front portion of the tractor, laterally offset outward beyond one side of said rear traction wheel and mounted for horizontal oscillatory movements.

2. A tractor having a wide drum-like rear traction wheel carrying the weight of the rear portion of the tractor and giving lateral stability thereto, a single front steering wheel carrying the weight of the front portion of the tractor, laterally offset outward beyond one side of said rear traction wheel and mounted for horizontal oscillatory movements, and a motor on said tractor having connections for driving both of said traction wheels, whereby the entire weight of the tractor is rendered effective in traction.

3. A tractor having a wide drum-like rear traction wheel carrying the weight of the rear portion of the tractor and giving lateral stability thereto, a single front steering wheel carrying the weight of the front portion of the tractor, laterally offset outward beyond one side of said rear traction wheel and mounted for horizontal oscillatory movements, a motor on said tractor, and independently operative driving connections between said motor and the said two wheels, whereby both may be driven simultaneously, or either one may be driven alone, at will.

4. In a tractor, the combination with a truck frame having a bifurcated rear portion and having, at one side, a forwardly projected arm, of a wide drum-like rear traction wheel located within and journaled to the sides of the rear bifurcated portion of said frame, and a wheel bracket swiveled to the front end of said arm and provided with a steering wheel that is located, laterally outward of one side of said drum.

5. A tractor having a wide drum-like rear traction wheel carrying the weight of the rear portion of the tractor and giving lateral stability thereto, a single front steering wheel carrying the weight of the front portion of the tractor, laterally offset outward beyond one side of said rear traction wheel and mounted for horizontal oscillatory movements, a motor carried by said tractor, and independently operated and reversible driving connections between said motor and said two traction wheels.

6. A tractor having a wide drum-like rear traction wheel carrying the weight of the rear portion of the tractor and giving lateral stability thereto, a single front steering wheel carrying the weight of the front portion of the tractor, laterally offset outward beyond one side of said rear traction wheel and mounted for horizontal oscillatory movements, and motor driven transmission mechanism including a reversible driving gear and independently operative driving connections therefrom to said wheels.

7. A tractor having a wide drum-like rear traction wheel carrying the weight of the rear portion of the tractor and giving lateral stability thereto, and a single front steering wheel carrying the weight of the front portion of the tractor, laterally offset outward beyond one side of said rear traction wheel and mounted for horizontal oscillatory movements, the said tractor comprising a frame including side members, and a rearwardly extensible supplemental frame having side members slidably connected to the side members of the main frame.

In testimony whereof I affix my signature in presence of two witnesses.

CHARLES F. KILGORE.

Witnesses:
   EVA E. KÖNIG,
   HARRY D. KILGORE.